(12) United States Patent
Shibata et al.

(10) Patent No.: US 10,458,489 B2
(45) Date of Patent: Oct. 29, 2019

(54) SELECTABLE ONE-WAY CLUTCH (71) Applicant: TOYOTA JIDOSHA KABUSHIKI KAISHA, Toyota-shi, Aichi-ken (JP)

(72) Inventors: Hiroyuki Shibata, Odawara (JP); Hiroyuki Shioiri, Yokohama (JP); Mitsuaki Tomita, Susono (JP); Shotaro Kato, Shizuoka-ken (JP); Yuki Kurosaki, Yamato (JP); Takahiro Shiina, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 51 days.

(21) Appl. No.: 15/913,245

(22) Filed: Mar. 6, 2018

(65) Prior Publication Data
US 2018/0259012 A1  Sep. 13, 2018

(30) Foreign Application Priority Data

Mar. 8, 2017 (JP) .................................. 2017-044346

(51) Int. Cl.
| F16D 41/12 | (2006.01) |
| F16D 23/14 | (2006.01) |
| F16D 41/06 | (2006.01) |
| F16D 11/10 | (2006.01) |

(52) U.S. Cl.
CPC ........... F16D 41/125 (2013.01); F16D 23/14 (2013.01); F16D 11/10 (2013.01); F16D 2023/141 (2013.01); F16D 2041/0603 (2013.01)

(58) Field of Classification Search
CPC ........ F16D 41/12; F16D 41/125; F16D 41/14; F16D 41/16; F16D 11/10; F16D 23/14; F16D 2023/141
See application file for complete search history.

(56) References Cited

U.S. PATENT DOCUMENTS

| 6,373,157 | B1* | 4/2002 | Sekine .................. F16D 41/125 192/46 |
| 7,344,010 | B2 | 3/2008 | Fetting et al. |
| 9,188,170 | B2 | 11/2015 | Prout et al. |
| 2002/0108831 | A1* | 8/2002 | Pawley ................. F16D 41/125 192/45.1 |
| 2009/0078073 | A1* | 3/2009 | Kubo ...................... F16D 21/04 74/335 |
| 2015/0105205 | A1* | 4/2015 | Kurosaki ............... B60K 6/445 475/5 |

(Continued)

Primary Examiner — Jacob S. Scott
Assistant Examiner — Lori Wu
(74) Attorney, Agent, or Firm — Hunton Andrews Kurth LLP (57) ABSTRACT The selectable one-way clutch includes a pocket plate, a notch plate, a cover plate, and plate-like struts. A one end portion of each strut is provided with an engagement surface and a projecting portion. Each strut comes into an erect state in which the engagement surface of the strut erects from the other surface of the cover plate toward the notch plate side. The selectable one-way clutch moves the notch plate in the axial direction to change a distance in the axial direction between the pocket plate and the notch plate, thereby carrying out switching between an out-of-engagement state in which the erecting struts cannot contact with the notches and a one-way clutch state in which the erecting struts can contact with the notches.

10 Claims, 8 Drawing Sheets

(56) References Cited

U.S. PATENT DOCUMENTS

2015/0211587 A1* 7/2015 Kimes .................... F16D 41/16
                                                    192/43.1
2016/0265604 A1* 9/2016 Magarida .............. F16D 41/125
2016/0281801 A1* 9/2016 Magarida .............. F16D 41/125
2016/0375754 A1* 12/2016 Kurosaki ............... B60K 6/383
                                                    475/5

* cited by examiner

SELECTABLE ONE-WAY CLUTCH

INCORPORATION BY REFERENCE

The disclosure of Japanese Patent Application No. 2017-044346 filed on Mar. 8, 2017 including the specification, drawings and abstract is incorporated herein by reference in its entirety.

BACKGROUND

1. Technical Field

The present disclosure relates to a selectable one-way clutch.

2. Description of Related Art

As one type of a one-way clutch, there has been known a selectable one-way clutch (SOWC) that is selectively switchable between a one-way clutch state that is engageable in only one rotation direction and an idling state that is not engageable.

U.S. Pat. No. 9,188,170 describes a selectable one-way clutch including: a pocket plate having multiple pockets (accommodating recessed portions) in which struts are accommodated; a notch plate formed with multiple notes (engagement recessed portions); and a cover plate disposed between the pocket plate and the notch plate, wherein these plates are assembled. In this selectable one-way clutch, an annular hydraulic piston is reciprocated in the axial direction so as to carry out switching between a state in which the struts are brought to erect toward the notch plate side and a state in which the struts are accommodated in the pockets. With this configuration, the state is switched between the one-way clutch state and the idling state.

SUMMARY

Unfortunately, in the selectable one-way clutch described in U.S. Pat. No. 9,188,170, one end portion of each strut completely projects from the cover plate, and an erection angle of the strut becomes greater, so that a stroke amount of the hydraulic piston becomes greater. Consequently, it is required to provide a hydraulic chamber in which a predetermined stroke amount is secured inside the selectable one-way clutch, which results in increase in dimension of the selectable one-way clutch.

In the configuration described in U.S. Pat. No. 9,188,170, the notch plate stays close to the pocket plate, and even in a state in which the hydraulic piston is withdrawn, when the struts erect toward the notch plate side due to disturbance such as vibrations, the struts collide against the notch plate in rotation. Through such repetitive collisions, abrasion of the struts progresses, which might cause deterioration of durability of the struts.

The present disclosure not only downsizes a selectable one-way clutch, but also enhances durability of the selectable one-way clutch.

An aspect of the present disclosure is a selectable one-way clutch. The selectable one-way clutch includes: a pocket plate having multiple accommodating recessed portions in one surface of an annular plate portion of the pocket plate; an annular notch plate configured to be relatively rotatable with respect to the pocket plate, the notch plate being provided with multiple engagement recessed portions on a surface thereof opposite to the surface of the pocket plate in which the accommodating recessed portions are provided; plate-like engagement pieces accommodated in the accommodating recessed portions; and an annular cover plate being fixed to the pocket plate in a state in which the cover plate faces the surface of the pocket plate provided with the accommodating recessed portions, the cover plate having multiple through-holes through which one end portions of the engagement pieces project toward an engagement recessed portion side. The one end portions of the engagement pieces include engagement surfaces configured to be engaged with the engagement recessed portions, and projecting portions configured to project in a length direction of the engagement pieces from the engagement surfaces so as to come into contact with one surface of the cover plate. The engagement pieces are configured such that in a state in which the projecting portions are in contact with one surface of the cover plate, the engagement surfaces come into an erect state in which the engagement surfaces project toward the notch plate side from the other surface of the cover plate. At least one of the pocket plate and the notch plate is configured to move in a rotation axis direction of the notch plate, and by changing a distance in an axial direction between the pocket plate and the notch plate, the selectable one-way clutch is configured to carry out switching between an out-of-engagement state in which the engagement pieces in the erect state are out of engagement with the engagement recessed portions and a one-way clutch state in which the engagement pieces in the erect state come into engagement with the engagement recessed portions.

With the above configuration, when the selectable one-way clutch comes into the out-of-engagement state, the engagement pieces cannot collide against the notch plate in rotation; therefore, it is possible to prevent abrasion of the engagement pieces due to the collision, or the like, thus enhancing durability thereof. Since the projecting portions of the engagement pieces are caught on the one surface of the cover plate, it is possible to reduce an erection angle (pitch angle) of each engagement piece, and suppress the pitch movement of the engagement pieces from becoming more than necessary. Through this, when carrying out the switching between the out-of-engagement state and the one-way clutch state, it is possible to reduce the amount of movement in the axial direction of the pocket plate or the notch plate. Accordingly, it is possible to reduce the stroke amount of the actuator that moves the pocket plate or the notch plate in the axial direction, to thereby suppress increase in dimension of the actuator.

In the selectable one-way clutch, a bottom portion of each accommodating recessed portion may include: a first bottom surface with which a surface of each engagement piece located on the accommodating recessed portion side comes into contact; and a second bottom surface that faces a surface of the one end portion of the engagement piece including at least the projecting portion, and is located at a deeper position than the first bottom surface.

With the above configuration, it is possible to suppress collision of the projecting portions of the engagement pieces against the bottom surfaces of the accommodating recessed portions. Accordingly, it is possible to enhance durability of the engagement pieces. For example, in the overrun state, it is possible to suppress the one end portion of each engagement piece from strongly coming into contact with the bottom portion of each accommodating recessed portion.

In the selectable one-way clutch, each engagement piece may include a cylindrical shaft portion in a recessed shape at the other end portion opposite to the one end portion, the shaft portion functioning as a turning fulcrum when the one end portion erects, the shaft portion having a height direction extending along a plate width direction of the engagement piece, and the bottom portion of each accommodating recessed portion may be provided with a cylindrical surface in a recessed shape facing a surface of the shaft portion, the cylindrical surface extending in a radial direction of the pocket plate.

With the above configuration, each engagement piece is formed with the cylindrical shaft portion functioning as the pitch rotation axis, along the plate width direction. In addition, the bottom portion of each accommodating recessed portion is formed with the cylindrical surface facing the surface of the shaft portion. Through this, it is possible to reduce amount of movements of the engagement pieces in directions other than that of the pitch movement thereof.

In the selectable one-way clutch, each accommodating recessed portion may include a meshing surface meshing with the other end portion of each engagement piece in the circumferential direction of the pocket plate, the other end portion of each engagement piece may include a back end surface meshing with the meshing surface of each accommodating recessed portion. The back end surface may be configured to come into surface-contact with the meshing surface on the other end portion side when the one end portion of each engagement piece comes into engagement with each engagement recessed portion.

With the above configuration, it is possible to allow the engagement pieces to come into surface-contact with the accommodating recessed portions when the engagement pieces mesh with the accommodating recessed portions. Accordingly, it is possible to enhance durability more than the case in which the engagement pieces come into line-contact with the accommodating recessed portions when they mesh with each other.

In the selectable one-way clutch, the cylindrical surface may be located at a deeper position than the meshing surface.

With the above configuration, in each accommodating recessed portion, the cylindrical surface is formed at a deeper position than the meshing surface, thereby securing this meshing surface as a flat surface.

In the selectable one-way clutch, the shaft portion may be provided with hemispherical ear-like portions projecting from both sides in the plate width direction of each engagement piece. The ear-like portions may be configured to come into contact with side wall surfaces of the accommodating recessed portion, the side wall surface being provided on both sides in the radial direction of the pocket plate.

With the above configuration, when a centrifugal force acts on the engagement pieces during rotation of the pocket plate, a reaction force against the centrifugal force acts on the engagement pieces from the ear-like portions. Hence, the reaction force acts on the vicinity of each shaft portion functioning as the pitch rotation axis. Through this, influence due to the centrifugal force is reduced relative to the pitch-movement moment of the engagement pieces. Accordingly, it is possible to reduce a force necessary for the erecting motion of the engagement pieces.

In the selectable one-way clutch, a radial opening width of each accommodating recessed portion may be wider on the one end portion side of the engagement piece than on the other end portion side of the engagement piece.

With the above configuration, it is possible to suppress the one end portion of each engagement piece from coming into contact with the side wall surface of the accommodating recessed portion; therefore, even if an external force such as vibrations that tends to disturb the pitch movement of the engagement pieces is present, this external force acts on the vicinity of the shaft portion of each engagement piece, that is, on the vicinity of the pitch rotation axis. Accordingly, it is possible to reduce influence of the external force relative to the pitch-movement moment of the engagement pieces. As a result, it is possible to reduce a force necessary for the erecting motion of the engagement pieces.

In the selectable one-way clutch, there may further be provided an actuator configured to move the notch plate in the axial direction.

With the above configuration, since the notch plate is moved in the axial direction by the actuator, it is possible to prevent vibrations or the like due to operation of the actuator from being inputted into the engagement pieces. Hence, it is possible to suppress input of an external force that disturbs the pitch movement of the engagement pieces.

In the selectable one-way clutch, the pocket plate may be configured to be relatively rotatable with respect to the notch plate, and when the engagement pieces come into engagement with the engagement recessed portions, the pocket plate may be configured to integrally rotate with the notch plate.

With the above configuration, the selectable one-way clutch includes the pocket plate and the notch plate that are relatively rotatable to each other, and in the engagement state, the pocket plate and the notch plate integrally rotate with each other; therefore, this selectable one-way clutch is provided with a clutching function. Accordingly, an application range of the selectable one-way clutch becomes increased.

In the selectable one-way clutch, there may further be provided an elastic member disposed in such a manner as to be held between the bottom portion of each accommodating recessed portion and each engagement piece, the elastic member urging the engagement piece toward the engagement recessed portion side. Each engagement piece may be configured to come into the erect state by the urging force of each elastic member.

With the above configuration, the engagement pieces are urged toward the notch plate side by the elastic members. The projecting portions of the engagement pieces are caught on the one surface of the plate cover, to thereby reduce the erection angle of each engagement piece; therefore, smaller elastic members may be disposed. Accordingly, it is possible to promote downsizing and weight reduction of the selectable one-way clutch.

With the above configuration, it is possible for the projecting portion of each engagement piece to come into contact with the cover plate, and reduce the erection angle of each engagement piece, and thus it is possible to suppress amount of projection of the one end portion from the cover plate. Hence, it is possible to reduce the distance in the axial direction that allows the notch plate to move to a position where the notch plate cannot come into contact with the engagement pieces. Through this, it is possible to reduce the stroke amount of the actuator, to thus suppress increase in dimension thereof. In addition, in the out-of-engagement state, since the engagement pieces cannot come into contact with the notch plate, it is possible to prevent the engagement pieces from colliding against the notch plate in rotation, to thereby promote enhancement of durability of the engagement pieces.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, with reference to drawings, a selectable one-way clutch according to an embodiment of the present disclosure will be specifically described.

Figure 1:
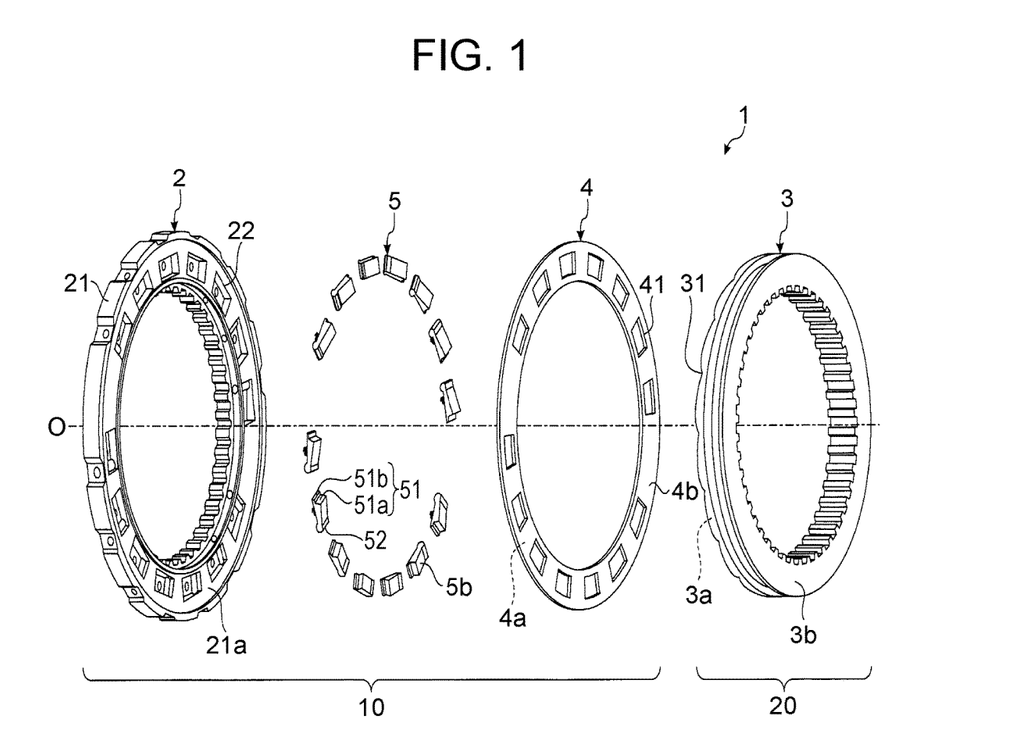
FIG. 1 is an exploded view schematically showing an overall configuration of a selectable one-way clutch in an embodiment.
Figure 2:
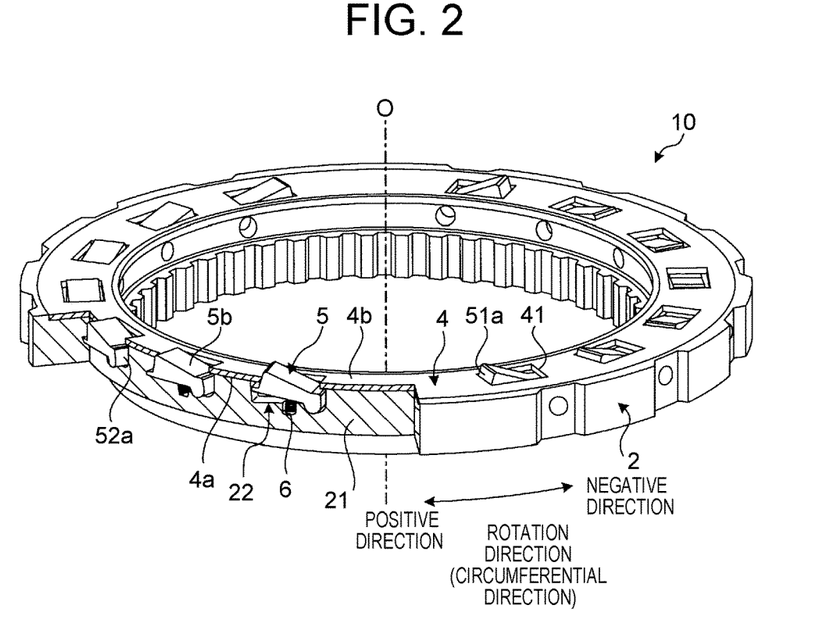
FIG. 2 is a partial sectional view explaining an erect state of struts.
Figure 3:
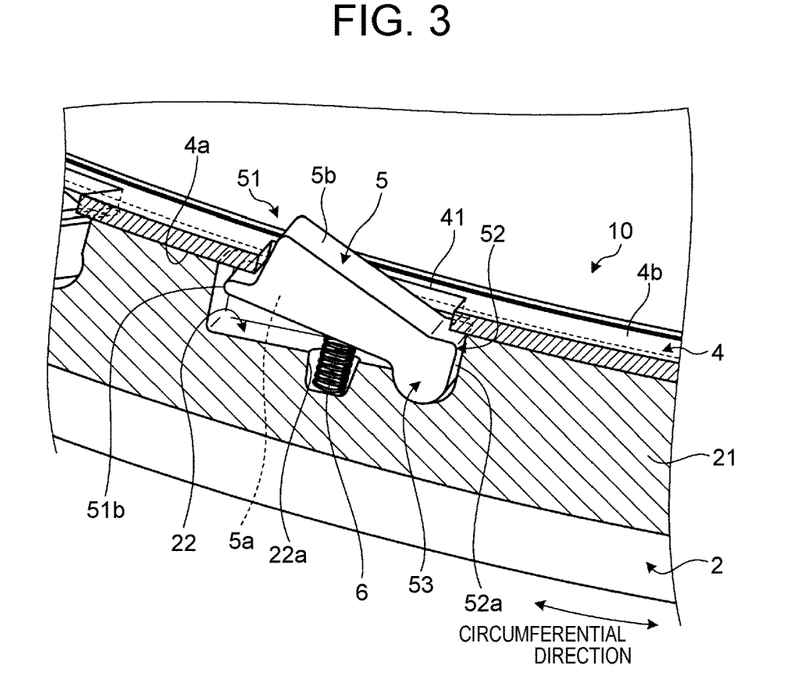
FIG. 3 is a partial enlarged view of FIG. 2.

With reference to FIG. 1 to FIG. 3, an overall configuration of the selectable one-way clutch (referred to as an "SOWC", hereinafter) will be described. An "axial direction" in this description means a direction of a rotation axis O of the SOWC indicated by a one-dot chain line in FIG. 1. "Rotation" means that a rotary member rotates on the rotation axis O. In addition, one rotation direction is described as a "positive rotation", and a rotation direction reverse to the positive rotation described as a "negative rotation". Further, when each of components is described, one face thereof in the axial direction might be referred to as a "surface", and the other face thereof in the axial direction might be referred to as a "back surface" in some cases.

As shown in FIG. 1, the SOWC1 includes: a pocket plate 2; a notch plate 3; a cover plate 4; and multiple struts 5. In the SOWC1, the pocket plate 2 and the notch plate 3 are arranged to be opposite to each other in the axial direction.

The pocket plate 2 is an annular rotary member integrally rotating with the struts 5. The pocket plate 2 includes an annular plate portion 21, and pockets 22 accommodating the struts 5. As shown in FIG. 1, of the plate portion 21, a surface 21a facing the notch plate 3 side is provided with the multiple pockets (accommodating recessed portions) 22. The surface 21a is an annular flat surface extending around an entire area in the circumferential direction of the plate portion 21. Each pocket 22 has a shape recessed from the surface 21a in a plate thickness direction, and the pockets 22 are provided with predetermined intervals in the circumferential direction.

In addition, between a bottom portion of each pocket 22 and each strut 5, an elastic member 6 urging this strut 5 toward the notch plate 3 side. For example, each elastic member 6 is composed by a coil spring. As shown in FIG. 2 and FIG. 3, each elastic member 6 is accommodated in each pocket 22 in such a manner as to be in contact with a bottom surface 5a of each strut 5. With such an urging force of the elastic member 6, the strut 5 is pushed toward the notch plate 3 side. A bottom portion of each pocket 22 is formed with an elastic-member accommodating recessed portion 22a in which the elastic member 6 is accommodated.

The notch plate 3 is an annular rotary member with which the struts 5 come into engagement. Of the notch plate 3, a surface 3a facing the pocket plate 2 side is provided with multiple notches (engagement recessed portions) 31 with which the struts 5 come into engagement (see FIG. 7). The multiple notches 31 are formed on the surface 3a of the notch plate 3 at positions corresponding to the pockets 22 of the pocket plate 2. Note that the struts 5 and the elastic members 6 are not illustrated in FIG. 7.

The cover plate 4 is an annular plate member that restricts movement (an axial direction motion) of the struts 5. As shown in FIG. 1, the cover plate 4 is provided with multiple through-holes 41 extending through the cover plate 4 in the plate thickness direction at positions corresponding to the pockets 22 of the pocket plate 2. Each through-hole 41 is a window hole through which each strut 5 can project, and there are provided the same number of the through-holes 41 as those of the pockets 22 and the struts 5.

As shown in FIG. 2, the cover plate 4 is attached to the pocket plate 2 in such a manner as to cover the surface 21a of the plate portion 21. In this attachment state, the cover plate 4 is rotationally fixed relative to the pocket plate 2 in such a manner that respective circumferential positions of the through-holes 41 and the pockets 22 overlap with each other. Note that the cover plate 4 is also fixed to the pocket plate 2 in the axial direction.

Each strut 5 is a plate-like engagement piece coming into engagement with the notch plate 3, and the multiple struts 5 are arranged such that respective length directions of the struts 5 extend along the circumferential direction. In each plate-like strut 5, the bottom surface 5a is a surface facing a bottom portion of the pocket 22, and a top surface 5b thereof opposite to the bottom surface 5a is a surface facing the notch plate 3 side. In the description of each strut 5, the circumferential direction is equivalent to a length direction of the strut 5, the axial direction is equivalent to a plate thickness direction of the strut 5, and a radial direction is equivalent to a plate width direction of the strut 5.

In such a strut 5, one front end portion (referred to as "one end portion", hereinafter) 51 in the circumferential direction is formed in a different shape from that of a rear end portion (referred to as "the other end portion") 52 opposite to the front end portion 51 in the circumferential direction. The one end portion 51 is a portion that erects toward the notch plate 3 side so as to come into engagement with the notch 31, and the other end portion 52 is a portion maintained to be accommodated inside the pocket 22. As shown in FIG. 2 and FIG. 3, each strut 5 is pushed by the elastic member 6 to erect in a posture tilting relative to the circumferential direction of the pocket plate 2, and a part of the one end portion 51 erects toward the notch plate 3 side through the through-hole 41. In this case, movement in the axial direction of the other end portion 52 is restricted by the cover plate 4 so as not to come outside of the pocket 22.

The one end portion 51 is provided with an engagement surface 51a coming into engagement with the notch 31, and a projecting portion 51b projecting in the circumferential direction more than the engagement surface 51a does. The projecting portion 51b is a portion coming into contact with one surface (hereinafter, referred to as a "back surface") 4a of the cover plate 4 when the one end portion 51 erects toward the notch plate 3 side.

As shown in FIG. 2 and FIG. 3, the projecting portion 51b is located closer to the bottom surface 5a in the plate thickness direction of the strut 5 than the engagement surface 51a is. The plate thickness of the strut 5 becomes gradually thicker from the other end portion 52 side toward the one end portion 51 side. With this, even in a state in which the projecting portion 51b is caught on the cover plate 4, the engagement surface 51a can project toward the notch plate 3 side from the cover plate 4. This means that when the strut 5 is pushed toward the notch plate 3 side by the urging force of the elastic member 6, the strut 5 comes into an erect state such that the engagement surface 51a projects toward the notch plate 3 side from the other surface 4b of the cover plate 4 while the projecting portion 51b is in contact with the back surface 4a of the cover plate 4. Then, in the SOWC1, the respective circumferential positions of the through-holes 41 and the pockets 22 always overlap with each other, and thus this erect state is maintained.

As shown in FIG. 3, the other end portion 52 is provided with a back end surface 52a coming into mesh with the pocket 22 and a shaft portion 53 formed at a position closer to the bottom surface 5a than the back end surface 52a. The shaft portion 53 is a portion functioning as a turning fulcrum (a pitch-movement rotation axis) when the one end portion 51 erects.

This shaft portion 53 is a cylindrical shaft portion that is provided on the bottom surface 5a side in the plate thickness direction of the strut 5, and extends in the plate width direction of the strut 5. That is, a height direction of the shaft portion 53 is parallel to the plate width direction of the strut 5. A surface 53a of the shaft portion 53 is a surface (a circular arc surface) curved in a projecting shape relative to the length direction of the strut 5, and extending in the plate width direction of the strut 5. Hence, the bottom surface 5a of the strut 5 is formed in a continuous manner from a flat surface into a projecting circular arc shape from the one end portion 51 side toward the other end portion 52 side. Each strut 5 of the present embodiment is provided with the shaft portion 53 through the entire area in the plate width direction of the strut 5.

The SOWC1 configured in this manner has a structure divided into a first engagement element 10 including the pocket plate 2, the struts 5, and the cover plate 4, and a second engagement element 20 including the notch plate 3. The first engagement element 10 is integrally configured while the struts 5 are held by the cover plate 4. On the other hand, the second engagement element 20 includes only the notch plate 3.

The first engagement element 10 is a rotary member, and the second engagement element 20 is a rotary member, and thus the SOWC1 is provided with a clutching function. The clutching function means a configuration having engagement elements (meshing elements) that are relatively rotatable to each other, and the engagement elements are integrally rotatable with each other in an engagement state. That is, the SOWC1 is configured to be a dog clutch that can transmit a torque between an input shaft and an output shaft. Note that a braking function means that one of the engagement elements is fixed in an unrotatable manner, and in the engagement state, the number of revolutions of each engagement element becomes zero.

In addition, the SOWC1 is configured to carry out switching between the idling state and the one way clutch state by changing a distance in the axial direction between the first engagement element 10 and the second engagement element 20. In the present embodiment, it is configured that in a state in which the first engagement element 10 (the pocket plate 2) is fixed in the axial direction, the second engagement element 20 (the notch plate 3) is movable in the axial direction. In the first engagement element 10, an inner circumference of the pocket plate 2 is spline-engaged with a first rotary shaft (not illustrated) such as an input shaft so as to integrally rotate with this first rotary shaft. In the second engagement element 20, an inner circumference of the notch plate 3 is spline-engaged with a second rotary shaft (not illustrated) such as an output shaft so as to integrally rotate with this second rotary shaft. When the second engagement element 20 moves in the axial direction, the notch plate 3 slides in the axial direction on the second rotary shaft.

The inner circumference portion of the pocket plate 2 is fixed to the first rotary shaft in the axial direction by a snap ring, a lock nut, or the like. Alternatively, the back surface of the pocket plate 2 may be supported by a thrust bearing so as to restrict movement in the axial direction of the pocket plate 2.

Here, with reference to FIG. 4 to FIG. 6, a switching motion between the idling state and the one-way clutch state will be described. Note that FIG. 5 exemplifies the idling state, and FIG. 6 exemplifies the one-way clutch state.

Figure 4:
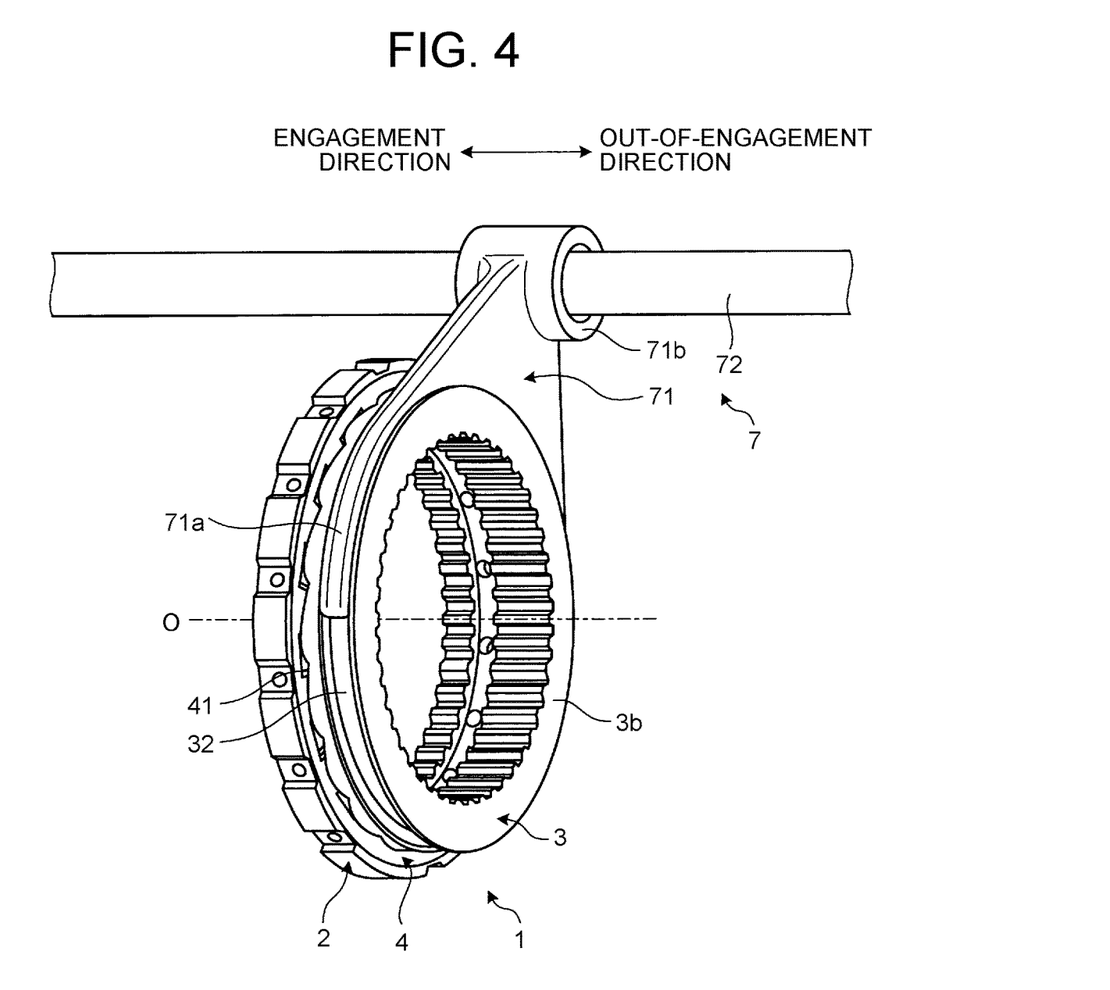
FIG. 4 is a perspective view explaining an actuator.

As shown in FIG. 4, the SOWC1 includes an actuator 7 that allows the notch plate 3 to move in the axial direction. When this actuator 7 operates, the notch plate 3 moves in the axial direction so as to change the distance in the axial direction between the first engagement element 10 and the second engagement element 20.

The actuator 7 includes a shift fork 71 fitted to an outer circumference of the notch plate 3, and a moving shaft 72 disposed in parallel to the rotation axis O, and moving in the axial direction.

The shift fork 71 is a member to apply a force (thrust) in the axial direction to the notch plate 3, and includes a claw 71a fitted in a fitting groove 32 of the notch plate 3, and a cylindrical portion 71b fixed to the moving shaft 72. The fitting groove 32 extends around the entire outer circumference of the notch plate 3 in the circumferential direction. when the moving shaft 72 moves in the axial direction in a state in which the claw 71a is fitted in the fitting groove 32, a force in the axial direction acts from the claw 71a onto side surfaces of the fitting groove 32 (annular-shaped groove wall surfaces provided on both axial sides of the claw 71a) so that the notch plate 3 moves in the axial direction. The moving shaft 72 is connected to a well-known moving device, and the force in the axial direction is applied from this moving device.

Figure 5:
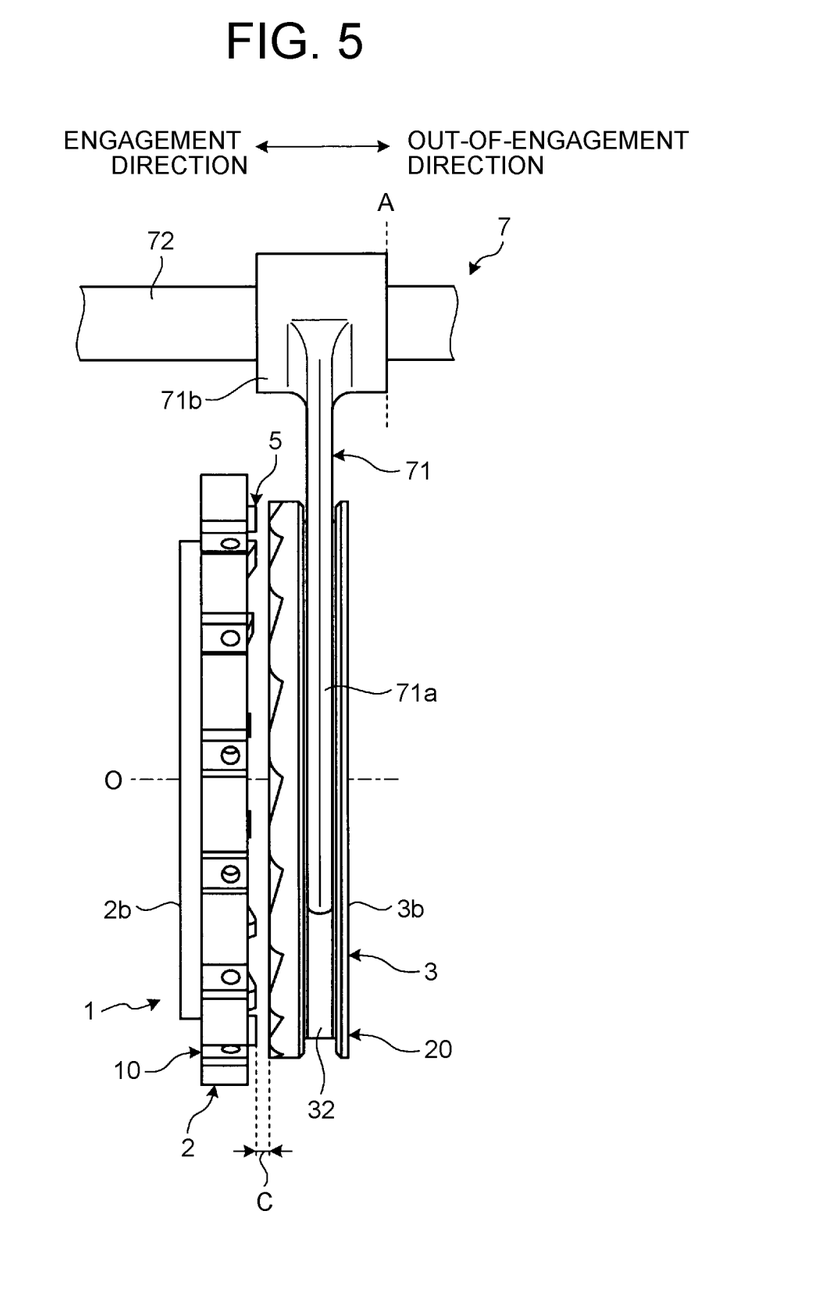
FIG. 5 is a view explaining an idling state.

As shown in FIG. 5, when the position in the axial direction of the shift fork 71 is located at a predetermined out-of-engagement position A, the SOWC1 comes into the idling state. On the other hand, as shown in FIG. 6, when the position in the axial direction of the shift fork 71 is located at a predetermined engagement position B, the SOWC1 comes into the one-way clutch state. The shift fork 71 reciprocates in the axial direction between the out-of-engagement position A and the engagement position B, a stroke amount S of the actuator 7 corresponds to a distance in the axial direction between the out-of-engagement position A and the engagement position B. The stroke amount S is set to be a distance in the axial direction obtained by adding amount of projection of each strut 5 from the cover plate 4 and a predetermined clearance C between this strut 5 and a surface 3a of the notch plate 3.

As shown in FIG. 5, the idling state of the present embodiment denotes an out-of-engagement state in which the distance in the axial direction between the first engagement element 10 and the second engagement element 20 becomes greater to a distance where the struts 5 in an erect state cannot come into contact with the notches 31 (the notch plate 3). In this idling state (the out-of-engagement state), a torque transmitting path between the first engagement element 10 and the second engagement element 20 is shut off so as to transmit no torque.

Through the switching motion (the engagement motion) from the idling state to the one-way clutch state, the position in the axial direction of the shift fork 71 is displaced in the engagement direction by the stroke amount S from the out-of-engagement position A to the engagement position B. Through this, the notch plate 3 moves to the engagement direction in the axial direction until the notch plate 3 reaches a position where the notches 31 can come into contact with the erecting struts 5 (a meshable position). Accordingly, the SOWC1 is switched from the idling state to the one-way clutch state.

Figure 6:
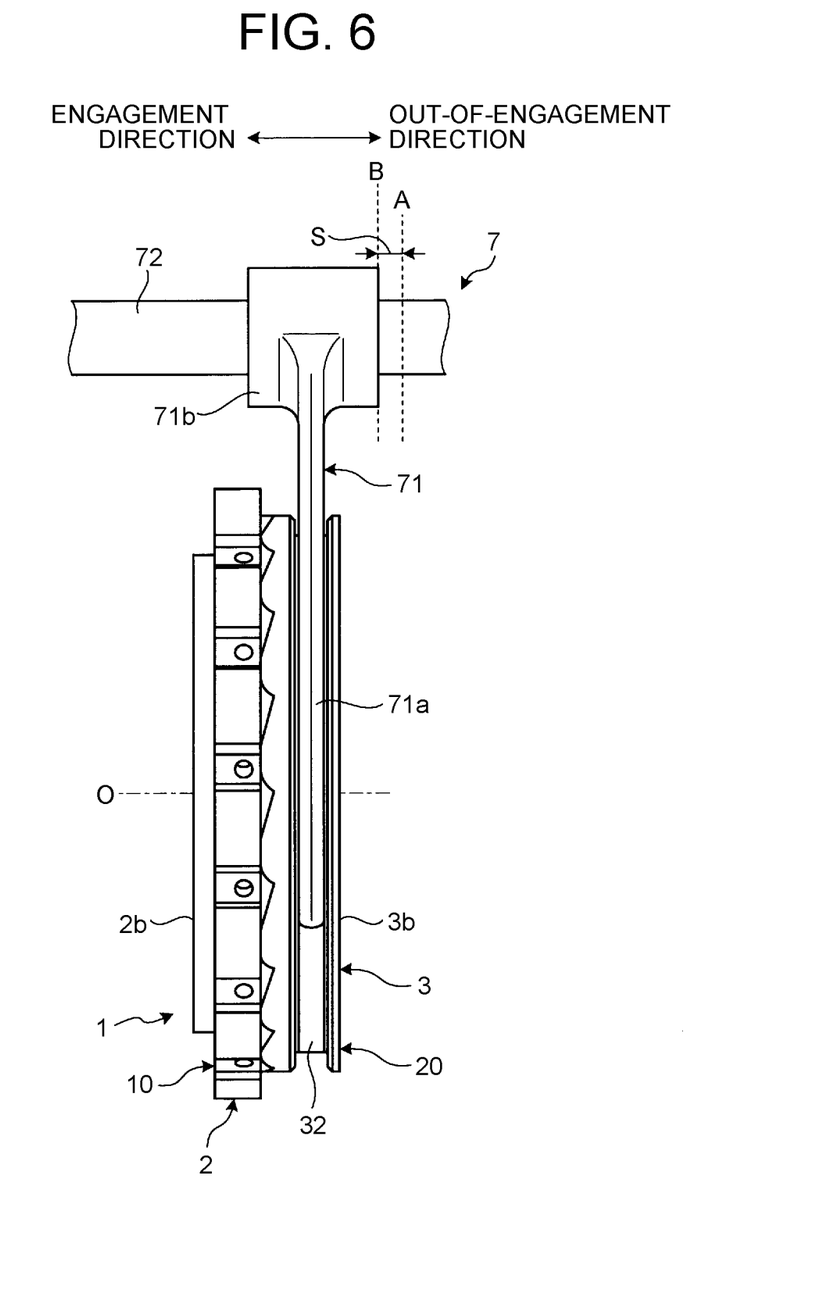
FIG. 6 is a view explaining a one-way clutch state.

As shown in FIG. 6, the one-way clutch state of the present embodiment denotes a state in which the distance in the axial direction between the first engagement element 10 and the second engagement element 20 is narrowed to a distance where the struts 5 in the erect state can come into contact with the notches 31 of the notch plate 3. The one-way clutch state is a state in which the struts 5 can be engaged with the notches 31 (an engageable state).

The one-way clutch state includes the case in which the struts 5 come into engagement with the notches 31 (engagement state), and the case in which the struts 5 come out of engagement with the notches 31 (overrun state). In the engagement state, the pocket plate 2 integrally rotates with the notch plate 3. The overrun state is a state in which the notch plate 3 runs over the struts 5 and rotates, so that the pocket plate 2 and the notch plate 3 relatively rotate to each other. In this manner, in the one-way clutch state, the torque transmitting path between the first engagement element 10 and the second engagement element 20 is connected so as to transmit a torque in the engagement state; but in the overrun state, the torque transmitting path is shut off so as to transmit no torque.

In the switching motion from the one-way clutch state to the idling state (the out-of-engagement motion), the position in the axial direction of the shift fork 71 is displaced in the out-of-engagement direction by the stroke amount S from the engagement position B to the out-of-engagement position A. Accordingly, the notch plate 3 moves toward the out-of-engagement direction in the axial direction to a position where the notches 31 cannot come into contact with the struts 5 in the erect state (an out-of-meshing position). As a result, the SOWC1 is switched from the one-way clutch state to the idling state.

Figure 7:
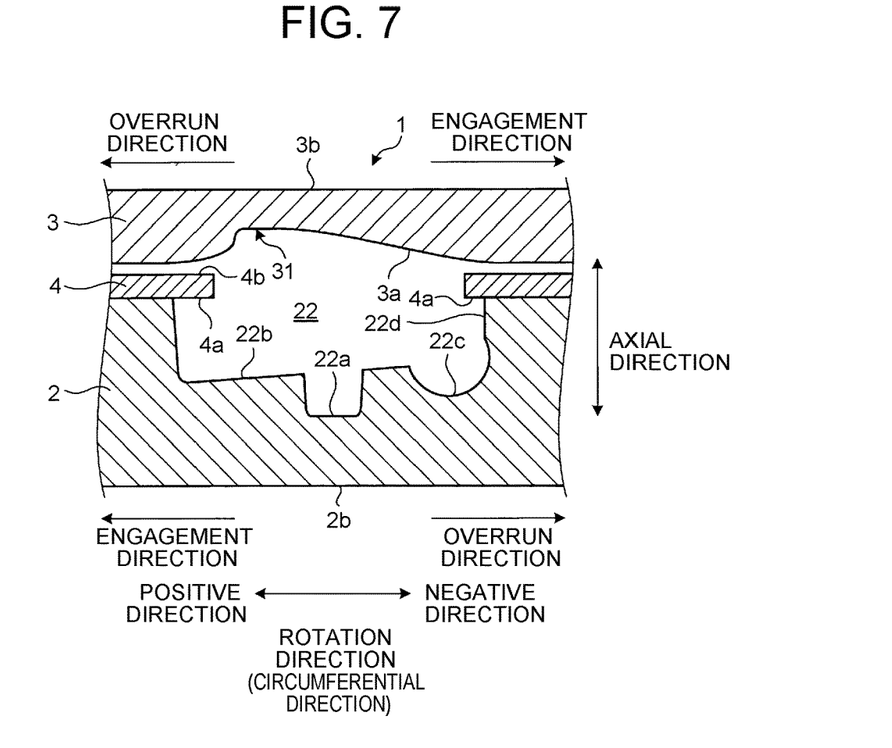
FIG. 7 is a sectional view schematically showing an internal structure of a pocket.

In addition, in the one-way clutch state of the present embodiment, since both the pocket plate 2 and the notch plate 3 are rotary members, it is determined whether the state is the engagement state or the overrun state based on not only the rotation direction of the notch plate 3, but also a magnitude correlation between the number of revolutions of the pocket plate 2 and the number of revolutions of the notch plate 3. For example, a direction when the engagement surface 51a of each strut 5 faces frontward in the rotation direction is defined as a positive direction, and a direction when the engagement surface 51a faces backward in the rotation direction is defined as a negative direction (see FIG. 2). In this case, as shown in FIG. 7, the positive direction corresponds to the engagement direction in the pocket plate 2; to the contrary, the positive direction corresponds to the overrun direction in the notch plate 3. In addition, the negative direction corresponds to the overrun direction in the pocket plate 2; to the contrary, the negative direction corresponds to the engagement direction in the notch plate 3. That is, when the rotation direction of the pocket plate 2 is different from the rotation direction of the notch plate 3, it is determined whether the state is the engagement state or the overrun state based on only the rotation direction. In the meantime, when the rotation direction of the pocket plate 2 is the same as the rotation direction of the notch plate 3, it is determine whether the state is the engagement state or the overrun state based on the direction relating to the rotary member whose number of revolutions is greater (the overrun direction, the engagement direction). For example, while the SOWC1 in the engagement state integrally rotates in the positive direction, if the number of revolutions of the notch plate 3 becomes greater than that of the pocket plate 2, the state comes into the overrun state. While the SOWC1 in the engagement state integrally rotates in the negative direction, if the number of revolutions of the pocket plate 2 becomes greater than that of the notch plate 3, the state comes into the overrun state. In the overrun state, the struts 5 collide against the notch plate 3 in rotation, and thus the struts 5 repeat the pitch movement between the surface 3a of the notch plate 3 and the bottom portions of the pockets 22. There is provided a gap in the axial direction between the other end portion 52 of each strut 5 and the back surface 4a of the cover plate 4.

Figure 8:
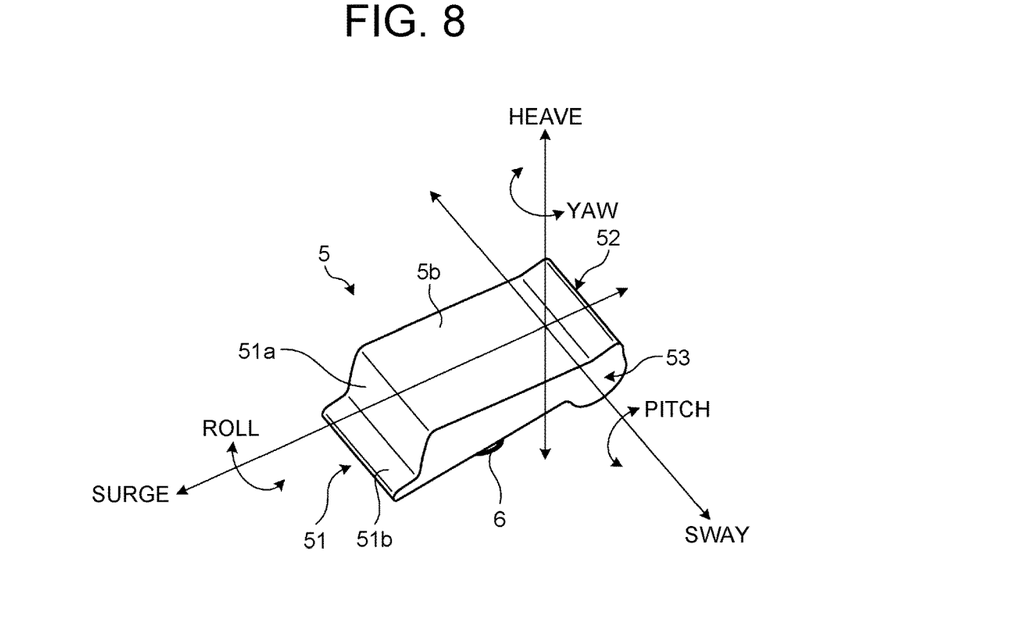
FIG. 8 is a perspective view explaining a behavior of the strut.

With reference to FIG. 8, the behavior of each strut 5 will be described. The behavior of the strut 5 includes a transitional movement and a rotational movement. As shown in FIG. 8, the transitional movement includes surge in the circumferential direction (back and forth swing), sway in the radial direction (right and left swing), and heave in the axial direction (up and down swing). The rotational movement includes roll (lateral swing), pitch (vertical swing), and yaw (tip swing).

For example, in the overrun state, since a top surface 5b of each strut 5 collides against the surface 3a of the notch plate 3, a pitch movement of the strut 5 resulting from this collision occurs. Specifically, the surface 3a of the notch plate 3 is smoothly curved relative to the circumferential direction. Hence, in the overrun state, the top surface 5b of the strut 5 collides against the surface 3a of the notch plate 3, and thus the one end portion 51 of the strut 5 is repelled to the bottom of the pocket 22. Then, the one end portion 51 moves closer to the bottom portion of the pocket 22 against the urging force of the elastic member 6, and the bottom surface 5a collides against a bottom surface 22b of the pocket 22. This strut 5 is repelled back from the bottom portion of the pocket 22, and collides against the notch plate 3 again. In this manner, in the overrun state, the pitch movement of the struts 5 is repeated.

To cope with this, the bottom surface 22b of each pocket 22 has a portion, which comes into contact with the bottom surface 5a of each strut 5, is formed to be an inclined surface gradually deeper in the plate thickness direction from the other end portion 52 side to the one end portion 51 side. Through this, it is possible to reduce a collision interval of the struts 5, and reduce magnification of collision energy so as to reduce an impact received by the struts 5 at the time of the overrun.

In addition, in the SOWC1, with the internal structure of the pocket 22, movements of the struts 5 other than the pitch movement (movements in the five directions: surge, sway, heave, roll, yaw) is suppressed. As shown in FIG. 7, each pocket 22 includes a cylindrical surface 22c facing the surface 53a of the shaft portion 53, and a meshing surface 22d in surface-contact with the back end surface 52a of the other end portion 52.

The cylindrical surface 22c is a surface recessed in a circular arc shape (curved surface in a recessed shape) from the bottom surface 22b, located closer to the other end portion 52 side than the elastic-member accommodating recessed portion 22a, in the circumferential direction, and extending in a cylindrical shape in the radial direction. A meshing surface 22d is a flat surface extending in the axial direction and the radial direction of the pocket plate 2 (see FIG. 8 and FIG. 9). For example, the back end surface 52a and the meshing surface 22d are rectangular flat surfaces long in the radial direction.

Since this cylindrical surface 22c faces the surface 53a of the shaft portion 53, it is possible to accept the pitch movement of the strut 5, and also reduce amount of movement relative to the movements in five directions thereof other than the pitch movement. Specifically, there is provided a gap between the cylindrical surface 22c and the surface 53a of the shaft portion 53. With this gap, the above-described movements in the five directions are restricted.

Even if an external force (disturbance) such as vibrations, which tends to disturb the pitch movement of each strut 5, is present, this external force acts on the vicinity of the shaft portion 53 of the strut 5, that is, the vicinity of a pitch rotation axis of each strut 5, and thus influence of the disturbance becomes smaller relative to a pitch-movement moment of the strut 5. Accordingly, when each strut 5 comes into engagement with each notch 31, the urging force (a spring force) of the elastic member 6 necessary for the erecting motion as a preliminary action of this engagement can be minimized.

In addition, the cylindrical surface 22c is provided at a deeper position than the meshing surface 22d in the axial direction (in the plate thickness direction of the plate portion 21). That is, the cylindrical surface 22c is undercut from the meshing surface 22d. With this configuration, the meshing surface 22d as a contact surface at the time of meshing can securely be a flat surface. Hence, in the structure of the present embodiment, compared with the case of carrying out a line contact between each strut 5 and each pocket 22 at the time of meshing with each other (in the case in which the back end surface 52a comes into contact with the cylindrical surface 22c), it is possible to enhance more durability of the struts 5. The deeper position denotes a position deeper in the plate thickness direction of the plate portion 21 inside the pocket 22.

As aforementioned, the SOWC1 has the stopper structure in which the projecting portions 51b of the struts 5 are caught on the cover plate 4. With this configuration, it is possible to restrict the erection angle of each strut 5, and reduce the amount of projection of the strut 5 from the cover plate 4. Hence, it is possible to reduce the distance necessary for moving the notch plate 3 in the axial direction to a position where the notch plate 3 cannot come into contact with the struts 5, to thereby reduce the stroke amount of the actuator 7; therefore, it is possible to suppress increase in dimension of the actuator 7. In addition, when disturbance such as vibrations is inputted into the struts 5, it is possible to suppress the struts 5 from erecting more than necessary, that is, suppress motion in the pitch direction of the struts 5.

The SOWC1 has a structure divided into the pocket plate 2 and the notch plate 3; and the distance in the axial direction therebetween can be changed, and thus, even if the struts 5 are in the erect state, the position in the axial direction of the notch plate 3 can be displaced to a position where the notch plate 3 cannot come into contact with the struts 5. Hence, in the idling state (the out-of-engagement state) of the SOWC1, it is possible to prevent the struts 5 from colliding against the notch plate 3 in rotation. With this configuration, it is possible to prevent abrasion of the struts 5 and others, and also enhance the durability of the struts 5.

In addition, since the pocket plate 2 moves in the axial direction by the actuator 7, it is possible to prevent vibrations and others caused by operation of the actuator 7 from being inputted into the struts 5. Hence, it is possible to suppress an external force that disturbs the pitch movement of the struts 5 from being inputted thereinto.

Next, variations of the SOWC1 of the above embodiment will be described. In the following description of the variations, description of the same configurations as those of the SOWC1 of the above embodiment will be omitted, and the same reference numerals are cited.

Figure 9:
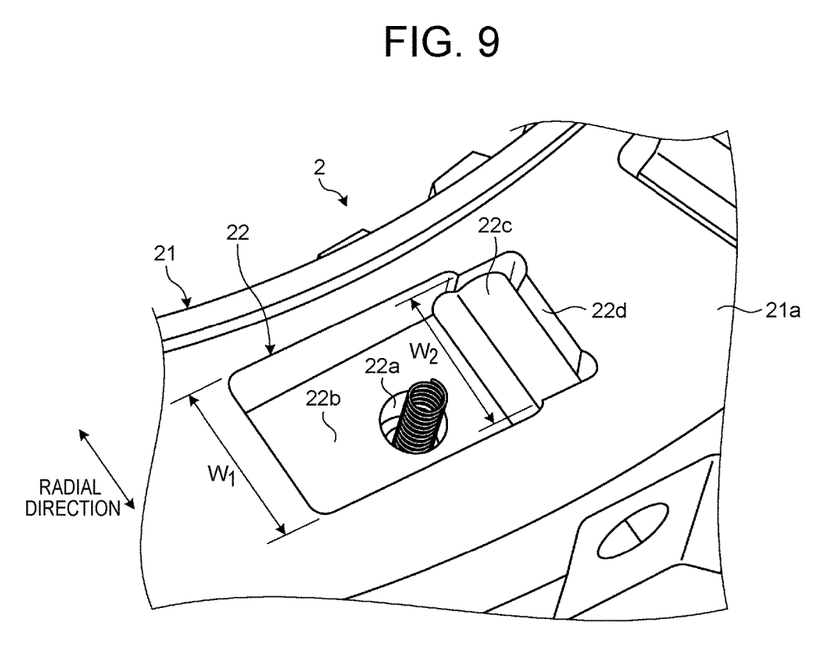
FIG. 9 is a view explaining a radial opening width of the pocket in a first variation.

The SOWC1 of the first variation has an opening shape of the pocket 22 which is different from that of the above embodiment. With reference to FIG. 9, the first variation will be described.

As shown in FIG. 9, in the pocket 22 of the first variation, a radial opening width $W_1$ on the one end portion 51 side is wider than a radial opening width $W_2$ on the other end portion 52 side. This means that the radial opening width of each pocket 22 is set to be smaller on the shaft portion 53 side of each strut 5.

According to the first variation, even if there is an external force (disturbance) such as vibrations, which tends to disturb the pitch movement of each strut 5, this external force acts on the vicinity of the shaft portion 53 of each strut 5, that is, the vicinity of a pitch rotation axis of each strut 5, and thus influence of the disturbance becomes smaller relative to the pitch-movement moment of the strut 5. Accordingly, when each strut 5 comes into engagement with each notch 31, the urging force (the spring force) of the elastic member 6 necessary for the erecting motion as a preliminary action of this engagement can be minimized.

Figure 10:
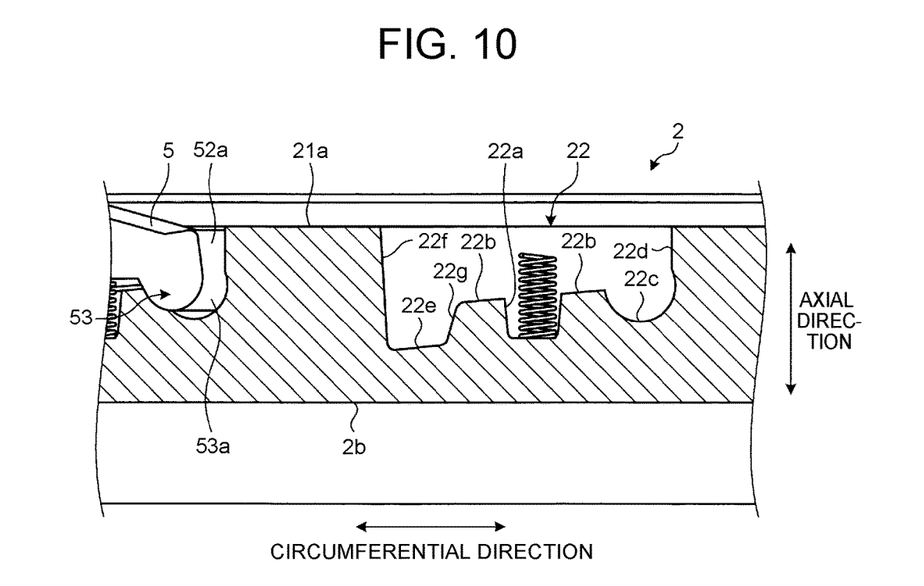
FIG. 10 is a sectional view schematically showing an internal structure of the pocket in a second variation.

The SOWC1 of the second variation has a structure of the bottom portion of the pocket 22 which is different from that of the above embodiment. With reference to FIG. 10, the second variation will be described. In the description of the second variation, the bottom surface 22b of the aforementioned pocket 22 is described as a "first bottom surface 22b".

As shown in FIG. 10, the bottom portion of each pocket 22 of the second variation includes a second bottom surface 22e at a part of this bottom portion facing the one end portion 51 of each strut 5, and this second bottom surface 22e is formed at a deeper position than the first bottom surface 22b. The second bottom surface 22e is provided within a range that faces a part of the bottom surface 5a of the strut 5, this part located closer to the one end portion 51 than a position where the bottom surface 5a comes into contact with the elastic-member accommodating recessed portion 22a, this part including at least the projecting portion 51b. The second bottom surface 22e is formed in the same dimension as the radial bottom width of the pocket 22 or as the radial opening width of the pocket 22.

In an example shown in FIG. 10, a structure having a step in the plate thickness direction of the plate portion 21 is formed by the first bottom surface 22b and the second bottom surface 22e. Specifically, in the internal structure of the pocket 22, there are formed a pocket wall surface 22f located at the front end, the second bottom surface 22e, a stepped surface 22g, the first bottom surface 22b, the elastic-member accommodating recessed portion 22a, the first bottom surface 22b, the cylindrical surface 22c, and the meshing surface 22d in this order, in series from the one end portion 51 side to the other end portion 52 side of the strut 5. The stepped surface 22g is an inclined surface forming a step whose level is gradually lower from the first bottom surface 22b to the second bottom surface 22e in the plate thickness direction of the plate portion 21. That is, the second bottom surface 22e is a surface inclined in the circumferential direction at the substantially same degree as that of the first bottom surface 22b, and the stepped surface 22g is inclined more steeply relative to the circumferential direction than the first bottom surface 22b is.

This second bottom surface 22e has a structure for preventing the projecting portion 51b of the strut 5 from coming into contact with the bottom portion of the pocket 22 in the overrun state. With this configuration, it is possible to suppress the projecting portion 51b from colliding against the bottom portion of the pocket 22, to thereby enhance durability of the projecting portion 51b.

In the overrun state, after the bottom surface 5a of the strut 5 comes into surface-contact with the first bottom surface 22b, a moment in a direction where the one end portion 51 side goes down toward the second bottom surface 22e is caused by the step structure. Due to this, there is caused a moment in a direction where the other end portion 52 side is lifted up toward the notch plate 3 side. Hence, the pocket 22 having the second bottom surface 22e functions as a structure to release an impact force at the moment when the one end portion 51 of the strut 5 collides against the bottom portion of the pocket 22. In addition, after the strut 5 collides against the bottom portion of the pocket 22, it is possible to reduce an erection speed of the one end portion 51.

According to the second variation, in the overrun state, after the bottom surface 5a of each strut 5 comes into surface-contact with the first bottom surface 22b, there is caused a moment in the direction where the other end portion 52 of the strut 5 is lifted up. With this, it is possible to suppress the strut 5 from being repelled back, and also reduce the erection speed of the one end portion 51 of the strut 5. Accordingly, in the overrun state, when each strut 5 repetitively collides against the notch plate 3 and the pocket plate 2, it is possible to reduce magnification of collision energy.

Note that the pocket 22 of the second variation may be configured to have no stepped surface 22g, but may be continuously formed from the first bottom surface 22b to the second bottom surface 22e. In this case, the second bottom surface 22e is an inclined surface inclined more steeply relative to the circumferential direction than the first bottom surface 22b is.

Figure 11:
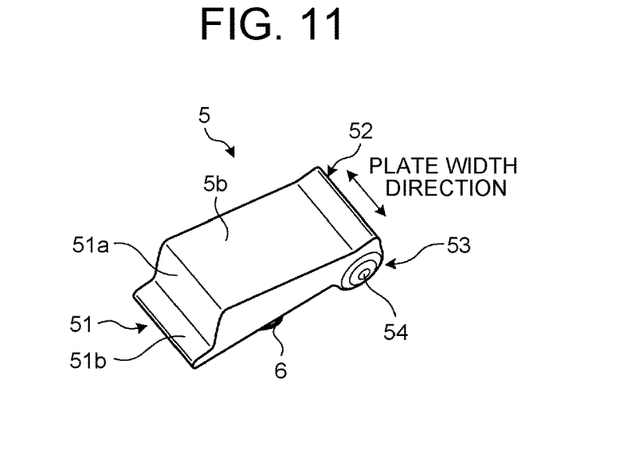
FIG. 11 is a perspective view schematically showing a structure of the strut in a third variation.
Figure 12:
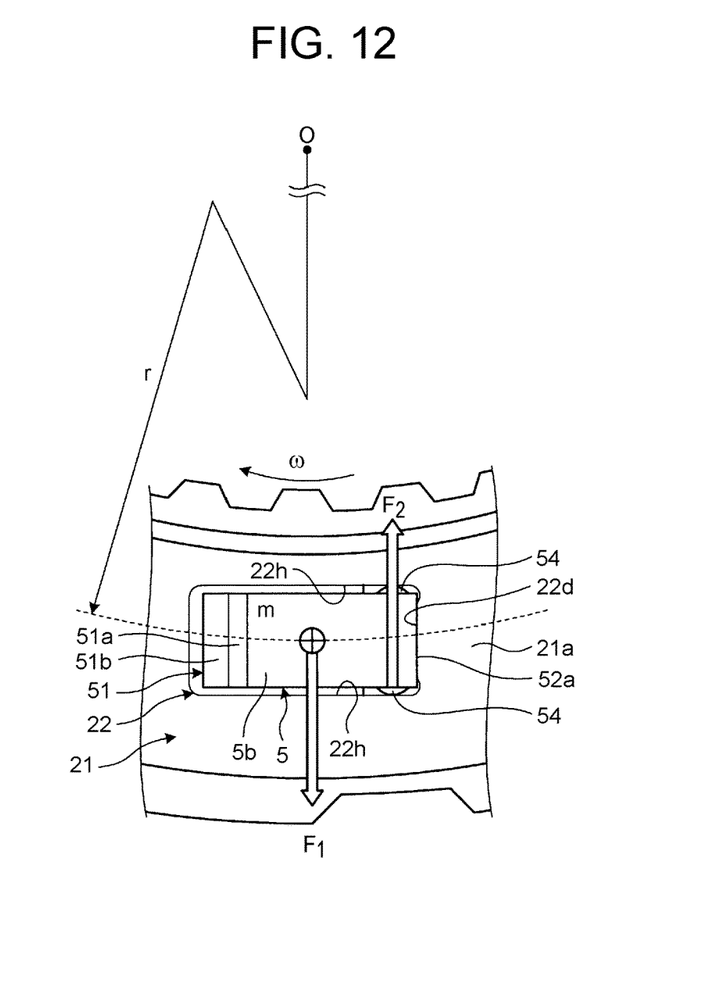
FIG. 12 is a view explaining a force acting on the strut during rotation.

The SOWC1 of the third variation has a structure of the strut 5 which is different from that of the aforementioned embodiment. With reference to FIG. 11 and FIG. 12, the third variation will be described.

As shown in FIG. 11, each strut 5 of the third variation is provided with hemispherical ear-like portions 54 on both sides in the plate width direction of the shaft portion 53. Each ear-like portion 54 projects in the plate width direction of the strut 5 more than the one end portion 51 side does.

As shown in FIG. 12, the back end surface 52a of the strut 5 is formed across the entire plate width direction except for the ear-like portions 54. Since the meshing surface 22d of the pocket 22 is in surface-contact with the substantially entire area of the back end surface 52a, the meshing surface 22d is in surface-contact with the strut 5 within a range equivalent to the plate width thereof. In this contact state, the ear-like portions 54 come into contact with both radial side wall surfaces 22h of the pocket 22. For example, each ear-like portion 54 comes into point-contact with each side wall surface 22h.

Specifically, in the vicinity of the pitch rotation axis, each strut 5 is supported at three points: the meshing surface 22d coming into surface-contact with the strut 5 across the entire area in the plate width direction thereof, and the side wall surfaces 22h coming into point-contact with the ear-like portions 54 on the both sides in the plate width direction. Hence, the strut 5 can take a stable posture relative to a yaw movement, with the above three positions (the both ear-like portions 54, 54 and the side wall surfaces 22h) as fulcrums thereof.

For example, as shown in FIG. 12, during the rotation of the pocket plate 2, when a centrifugal force $F_1$ acts on each strut 5, a reaction force $F_2$ against the centrifugal force $F_1$ acts on the ear-like portions 54. The reaction force $F_2$ is a force acting in the radially inward direction of the pocket plate 2. Since the ear-like portions 54 are located in the vicinity of the pitch rotation axis, the reaction force $F_2$ acts in the plate width direction of the strut 5 along the shaft portion 53. Note that the centrifugal force $F_1 = mr\omega^2$ is represented by a mass m of the strut 5, an angular velocity $\omega$ of the strut 5, and a rotational radius r of the strut 5.

According to the third variation, if the SOWC1 functions as a clutch, and engagement during a high-speed rotation is required, the reaction force $F_2$ acts on the shaft portion 53 from the ear-like portions 54; therefore, influence of the centrifugal force $F_1$ become smaller relative to the pitch-movement moment. Accordingly, when each strut 5 comes into engagement with each notch 31, the urging force (the spring force) of the elastic member 6 that is necessary for the erecting motion as a preliminary action of this engagement can be minimized. Hence, it becomes unnecessary to increase the dimension and the weight of each elastic member 6 in order to satisfy a necessary spring force.

The SOWC1 of the fourth variation is different from the above embodiment in that the pocket plate 2 is movable in the axial direction, and the notch plate 3 is fixed in the axial direction. In this case, the shift fork 71 of the actuator 7 is fitted onto the outer circumference of the pocket plate 2. The shift fork 71 reciprocates in the axial direction so that the pocket plate 2 moves in the axial direction, to thereby carry out the switching between the idling state (the out-of-engagement state) and the one-way clutch state.

An inner circumferential portion of the notch plate 3 of the fourth variation is fixed to the rotary shaft in the axial direction by a snap ring or a rock nut. Alternatively, a back surface 3b of the notch plate 3 may be supported by a thrust bearing, to thereby restrict movement in the axial direction of the notch plate 3.

The SOWC1 of the fifth variation is configured to function as a brake. In other words, any one of the pocket plate 2 and the notch plate 3 is a fixed member that is unrotatable, so that the SOWC1 is provided with a braking function.

As one example of the fifth variation, the pocket plate 2 is a fixed member that is unrotatable and fixed in the axial direction, and the notch plate 3 is a rotary member that is rotatable and movable in the axial direction. When the SOWC1 comes into the engagement state, the notch plate 3 is fixed in an unrotatable state. In the one-way clutch state, it is determined whether the state is the engagement state or the overrun state based on only the rotational direction of the rotary member. As shown in FIG. 7, when the notch plate 3 rotates in the positive direction (the overrun direction), the state comes into the overrun state. On the other hand, the notch plate 3 rotates in the negative direction (the engagement direction), the struts 5 come into engagement with the notches 31, so that the state comes into the engagement state. In this engagement state, rotation of the notch plate 3 in the engagement direction is restricted, and thus the number of revolutions of the notch plate 3 becomes zero.

As another example of the fifth variation, the pocket plate 2 may be a rotary member that is rotatable and movable in the axial direction, and the notch plate 3 may be a fixed member that is unrotatable and fixed in the axial direction.

The SOWC1 of the sixth variation has an actuator of a different type from that of the above embodiment. For example, the SOWC1 includes a hydraulic actuator or an electromagnetic linear actuator, instead of the aforementioned actuator 7.

As one example of the sixth variation, the notch plate 3 is moved in the axial direction by a hydraulic actuator. This hydraulic actuator includes an annular hydraulic piston that pushes the back surface 3b of the notch plate 3 toward the pocket plate 2 side (to the engagement direction) in the axial direction. In this case, the notch plate 3 is urged by a return spring in a direction apart from the pocket plate 2 (to the out-of-engagement direction) in the axial direction.

Alternatively, if the pocket plate 2 is movable in the axial direction, the hydraulic actuator is configured such that the back surface 2b of the pocket plate 2 is pushed by the hydraulic piston toward the notch plate 3 side (to the engagement direction) in the axial direction. A return spring that applies an urging force in a direction apart from the notch plate 3 in the axial direction is attached to this pocket plate 2. The back surface 2b is a surface opposite to the surface 21a.

Note that the present disclosure is not limited to the above embodiment and the above variations, and may appropriately be changed without departing from the scope of the present disclosure.

For example, in the SOWC1 having the clutching function, either of the first engagement element 10 and the second engagement element 20 may be an input element. That is, in the clutched SOWC1, the torque-transmission direction is not limited to specific one.

The member pushing each strut 5 toward the notch plate 3 side is not limited to the elastic member 6. For example, it is possible to control the pitch movement of the struts 5 by using a solenoid or the like. In this case, the SOWC1 is configured to include a solenoid instead of the elastic members 6 so as to allow the struts 5 to erect toward the notch plate 3 side by an electromagnetic force generated by the solenoid. The electromagnetic force generated by the solenoid may be either of a force (a repulsive force) pushing the one end portion 51 toward the notch plate 3 side and a force (an attractive force) pulling the one end portion 51 toward the notch plate 3 side. That is, the arrangement of the solenoid is not limited to specific one.

What is claimed is:

1. A selectable one-way clutch comprising:
a pocket plate having multiple accommodating recessed portions in one surface of an annular plate portion of the pocket plate;
an annular notch plate configured to be relatively rotatable with respect to the pocket plate, the notch plate being provided with multiple engagement recessed portions on a surface thereof opposite to the surface of the pocket plate in which the accommodating recessed portions are provided;
plate-like engagement pieces accommodated in the accommodating recessed portions; and
an annular cover plate being fixed to the pocket plate in a state in which the cover plate faces the surface of the pocket plate provided with the accommodating recessed portions of the pocket plate, the cover plate having multiple through-holes through which one end portions of the engagement pieces project toward an engagement recessed portion side,
the one end portions of the engagement pieces including engagement surfaces configured to be engaged with the engagement recessed portions, and projecting portions configured to project in a length direction of the engagement pieces from the engagement surfaces so as to come into contact with one surface of the cover plate,
the engagement pieces being configured such that in a state in which the projecting portions are in contact with the one surface of the cover plate, the engagement surfaces come into an erect state in which the engagement surfaces project toward the notch plate side from the other surface of the cover plate,
at least one of the pocket plate and the notch plate being configured to move in a rotation axis direction of the notch plate,
and
by changing a distance in the axial direction between the pocket plate and the notch plate, the selectable one-way clutch being configured to carry out switching between an out-of-engagement state in which the engagement pieces in the erect state are out of engagement with the engagement recessed portions and a one-way clutch state in which the engagement pieces in the erect state come into engagement with the engagement recessed portions.

2. The selectable one-way clutch according to claim 1, wherein
a bottom portion of each accommodating recessed portion includes: a first bottom surface with which a surface of each engagement piece located on the accommodating recessed portion side comes into contact; and a second bottom surface that faces a surface of the one end portion of the engagement piece including at least the projecting portion, and is located at a deeper position than the first bottom surface.

3. The selectable one-way clutch according to claim 1, wherein
each engagement piece includes a cylindrical shaft portion at the other end portion opposite to the one end portion, the shaft portion functioning as a turning fulcrum when the one end portion erects, the shaft portion having a height direction extending along a plate width direction of the engagement piece, and
a bottom portion of each accommodating recessed portion is provided with a cylindrical surface in a recessed shape facing a surface of the shaft portion, the cylindrical surface extending in a radial direction of the pocket plate.

4. The selectable one-way clutch according to claim 3, wherein
each accommodating recessed portion includes a meshing surface meshing with the other end portion of each engagement piece in the circumferential direction of the pocket plate,
the other end portion of each engagement piece includes a back end surface meshing with the meshing surface of each accommodating recessed portion, and
the back end surface is configured to come into surface-contact with the meshing surface on the other end portion side when the one end portion of each engagement piece comes into engagement with each engagement recessed portion.

5. The selectable one-way clutch according to claim 4, wherein
the cylindrical surface is located at a deeper position than the meshing surface.

6. The selectable one-way clutch according to claim 3, wherein
the shaft portion is provided with hemispherical ear-like portions projecting from both sides in the plate width direction of each engagement piece, and
the ear-like portions are configured to come into contact with side wall surfaces of the accommodating recessed portion, the side wall surface being provided on both sides in the radial direction of the pocket plate.

7. The selectable one-way clutch according to claim 1, wherein
a radial opening width of each accommodating recessed portion is wider on the one end portion side of the engagement piece than on the other end portion side of the engagement piece.

8. The selectable one-way clutch according to claim 1, further comprising an actuator configured to move the notch plate in the axial direction.

9. The selectable one-way clutch according to claim 1, wherein
the pocket plate is configured to be relatively rotatable with respect to the notch plate, and
when the engagement pieces come into engagement with the engagement recessed portions, the pocket plate is configured to integrally rotate with the notch plate.

10. The selectable one-way clutch according to claim 1, further comprising
an elastic member disposed in such a manner as to be held between a bottom portion of each accommodating recessed portion and each engagement piece, the elastic member urging the engagement piece toward the engagement recessed portion side,
wherein
each engagement piece is configured to come into the erect state by an urging force of each elastic member.

* * * * *